US006577905B1

(12) United States Patent
Robertson et al.

(10) Patent No.: US 6,577,905 B1

(45) Date of Patent: Jun. 10, 2003

(54) APPARATUS AND METHOD FOR PROVIDING A TRANSIENT PORT

(75) Inventors: Paul Gordon Robertson, Austin, TX (US); Hector Saenz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 419 days.

(21) Appl. No.: 09/606,639

(22) Filed: Jun. 29, 2000

(51) Int. Cl.7 ................................................ G05B 15/00

(52) U.S. Cl. ................................ 700/1; 700/7; 700/11; 710/107; 710/108; 710/118; 361/110; 361/111; 439/225; 439/579; 439/620

(58) Field of Search ........................ 700/1, 7–8, 11–14; 439/164, 15, 225, 675, 578–579, 620; 361/118–119, 110–111, 56, 730; 710/107, 108, 109, 110, 118

(56) References Cited

U.S. PATENT DOCUMENTS 5,857,072 A * 1/1999 Crowle ....................... 709/203
5,857,207 A * 1/1999 Lo et al. ..................... 707/203
5,870,764 A * 2/1999 Lo et al. ..................... 707/203
6,040,838 A * 3/2000 Webb et al. ................ 345/619
6,295,065 B1 * 9/2001 Tettington ................... 345/419
6,330,245 B1 * 12/2001 Brewer et al. .............. 370/424

* cited by examiner

*Primary Examiner*—Ramesh Patel
(74) *Attorney, Agent, or Firm*—Duke W. Yee; Mark E. McBurney; Stephen J. Walder, Jr.

(57) ABSTRACT

An apparatus and method for providing a transient connection port are provided. Further, an apparatus and method for switching between a permanent connection port and a transient connection port are provided. The apparatus and method include a permanent connection port and a transient connection port located at the rear of a rack mounted server system and the front of the rack mounted server system, respectively. The permanent connection port operates when there is an absence of a connected device at the transient connection port. When a device is connected to the transient connection port, a signal is sent to a logic switch which causes the active input to be switched from the permanent connection port to the transient connection port. When the device is no longer connected to the transient connection port, the absence of the signal from the transient connection port causes the logic switch to switch the active input back to the permanent connection port.

34 Claims, 4 Drawing Sheets

START
510
TRANSIENT PORT ACTIVE ?
NO
520
RECEIVE INPUT FROM AND SEND OUTPUT TO PERMANENT PORT
YES
530
SWITCH TO TRANSIENT PORT
RECEIVE INPUT FROM AND SEND OUTPUT TO TRANSIENT PORT
540
NO
TRANSIENT PORT INACTIVE ?
550
YES
SWITCH TO PERMANET PORT
560
NO
TERMINATION CONDITION?
570
YES
END

APPARATUS AND METHOD FOR PROVIDING A TRANSIENT PORT

BACKGROUND OF THE INVENTION

1. Technical Field

The present invention is directed to an apparatus and method for providing a transient port. In particular, the present invention is directed to an apparatus and method for determining when a transient port is active and switching inputs from a permanent port to the transient port when the transient port is active.

2. Description of Related Art

In traditional rack mounted server systems, only a rear port is provided in the server system for access. This rear port is typically used to connect a terminal for configuring the server system and to provide error logging. Recently, rack mounted server systems have been developed for allowing small hand-held devices to be attached to the server system to perform these configuration and error logging functions. As with the traditional terminal based configuration, these hand-held devices also must be connected to a permanent rear connection port. This can be very cumbersome when only very temporary connections are necessary to perform the configuration and error logging processes.

Therefore, it would be beneficial to have an apparatus and method for providing a front connection port in a rack mounted server system. It would further be beneficial to have an apparatus and method for switching between a permanent connection port and a transient connection port.

SUMMARY OF THE INVENTION

The present invention provides an apparatus and method fpr providing a transient connection port. The present invention further provides an apparatus and method for switching between a permanent connection port and a transient connection port.

The apparatus and method of the present invention includes a permanent connection port and a transient connection port. In a preferred embodiment, the permanent connection port is located at the rear of a rack mounted server system and the transient connection port is located at the front of a rack mounted server system.

The permanent connection port operates when there is an absence of a connected device at the transient connection port. In other words, the transient connection port is only active when a device is connected to the transient connection port.

When a device is connected to the transient connection port, a signal is sent to a logic switch which causes the active input to be switched from the permanent connection port to the transient connection port. When the device is no longer connected to the transient connection port, the absence of the signal from the transient connection port causes the logic switch to switch the active input back to the permanent connection port.

By using the present invention, a convenient alternate mechanism to connect to a rack mounted server system is provided. In addition, the connection mechanism of the present invention provides a convenient method for connecting to a server system without requiring expensive additional hardware, software or firmware. Thus, the cost of the server system is minimized while the versatility is increased.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
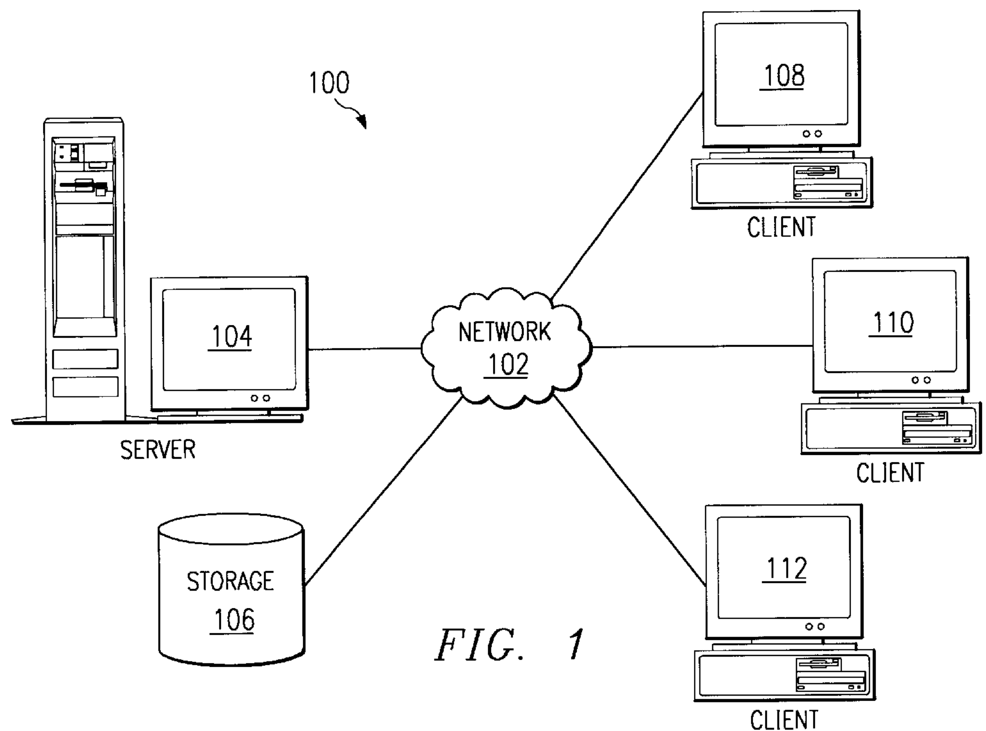
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
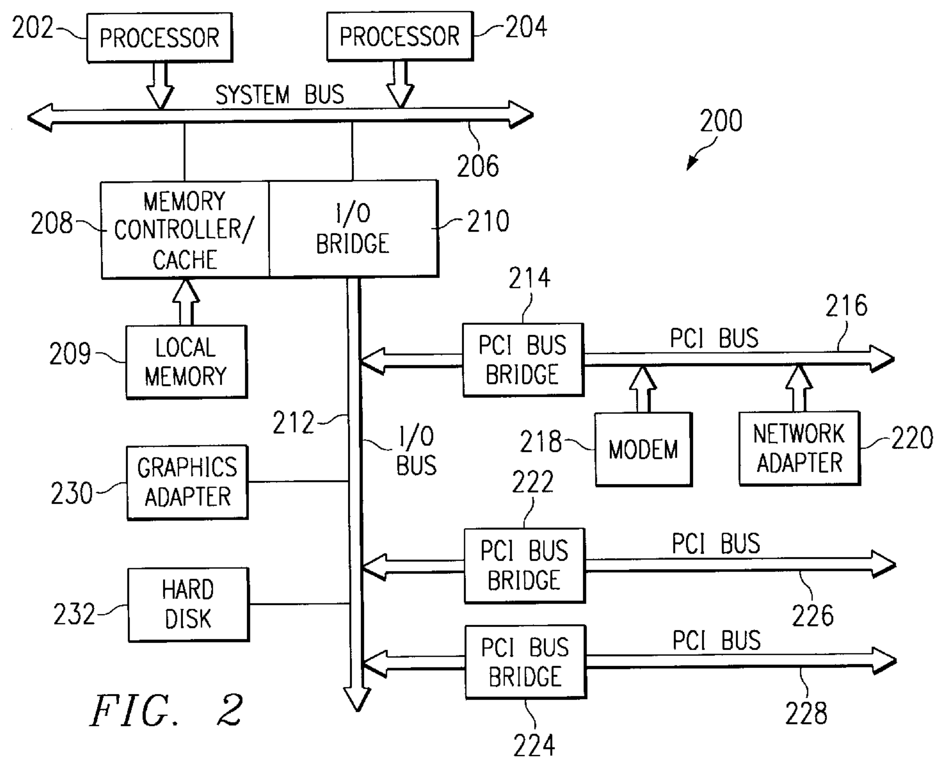
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

The present invention provides a mechanism by which a transient connection port and a permanent connection port may be utilized with a device, such as a rack mounted server system. The present invention provides a mechanism by which input/output is switched between a transient connection port and a permanent connection port based on the presence or non-presence of an external device at the transient connection port.

The present invention may be implemented, for example, in a server system, such as server 200, and the like. However, the present invention is not limited to use with a server system. Rather, any device having a transient port and a permanent port may make use of the present invention without departing from the spirit and scope of the present invention. For ease of explanation, however, the following examples of the preferred embodiments will be described in terms of a rack mounted server system.

Figure 3:
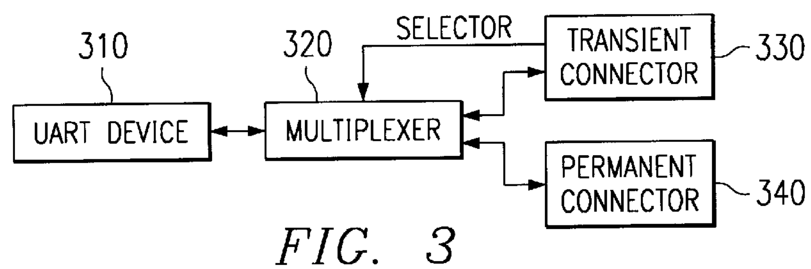
FIG. 3 is an exemplary block diagram of the switching mechanism of the present invention.

FIG. 3 is an exemplary block diagram illustrating the primary elements of the present invention. As shown in FIG. 3, the present invention includes a universal asynchronous receive/transmit (UART) device 310, a multiplexer 320, a transient connector 330 and a permanent connector 340. Signals and data flow between these elements in a bi-directional manner as illustrated by the double-headed arrows. A selector signal flows from the transient connector 330 to the multiplexer 320 when an external device is coupled to the transient connector 330.

The UART device 310 may be any type of universal asynchronous receive/transmit device. For example, the UART device 310 may be a server system, a data processing system, and the like.

The transient connector 330 and the permanent connector 340 may be any type of connector for connecting the UART device 310 to an external device. For example, the transient connector 330 and the permanent connector 340 may be serial communication ports, parallel communication ports, coaxial cable connection ports, wireless communication transceivers, traditional telephone communication ports, and the like.

In a preferred embodiment, the transient connector 330 and the permanent connector 340 are both RS-232 communication ports to which an external device may be coupled via a traditional telephone cable. While the preferred embodiment has both connectors 330 and 340 being of the same type, the invention is not limited in this way and the connectors 330 and 340 may be of different types.

The transient connector 330 and permanent connector 340 may be positioned in any configuration relative to the UART device 310 without departing from the spirit and scope of the present invention. However, one of the advantages of the present invention is that the transient connector 330 may be placed in a position that is relatively easy to access by a human operator. In this way, the human operator may connect external devices to the transient connector 330 with minimal effort while still maintain the permanent connector 340 which may be in a less convenient location relative to the UART device 310.

In a preferred embodiment, the transient connector 330 is located on a front portion of a rack mounted server system while the permanent connector 340 is located on a back portion of the rack mounted server system. In this way, a human operator can connect a portable device, such as a personal digital assistant, to the transient connector 330, perform necessary operations, and disconnect the portable device with minimal effort. This may be very beneficial when, for example, configuring the rack mounted server system or obtaining error log information from the rack mounted server system where the portable device need only be connected to the server system for a short period of time.

The multiplexer 320 is used to provide a mechanism by which input/output is switched between the transient connector 330 and the permanent connector 340. The multiplexer 320 may be implemented in hardware, software, or a combination of hardware and software.

In operation, the default setting of the multiplexer 320 is that input/output to the UART device 310 is provided to the permanent connector 340. However, if an external device is coupled to the transient connector 330, the transient connector sends a selector signal to the multiplexer 320. In response to receiving the selector signal 330, the multiplexer 320 switches the input/output so that it is provided to the transient connector 330 while the selector signal is being received from the transient connector 330. Once the selector signal is no longer being received from the transient connector 330, input/output is switched back to the permanent connector 340.

In this way, the transient connector 330 is "transient" in that it is only provided input/output when an external device is coupled to the transient connector 330. The permanent connector 340 is permanent in that it is always provided input/output with the exception of when the transient connector 330 is operational.

Figure 4A:
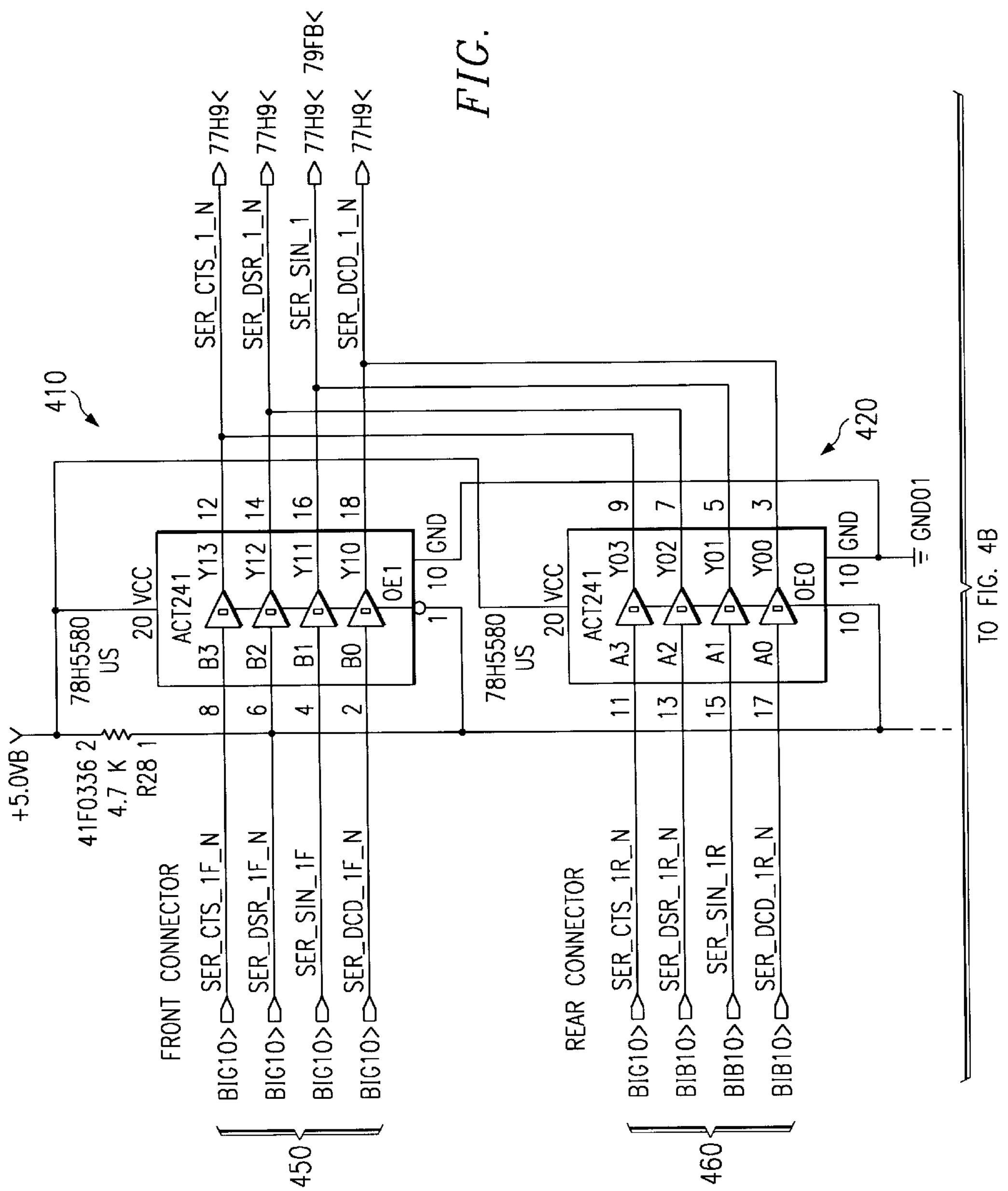
FIGS. 4A and 4B is an exemplary logic gate diagram illustrating an exemplary embodiment of the present invention.
Figure 4B:
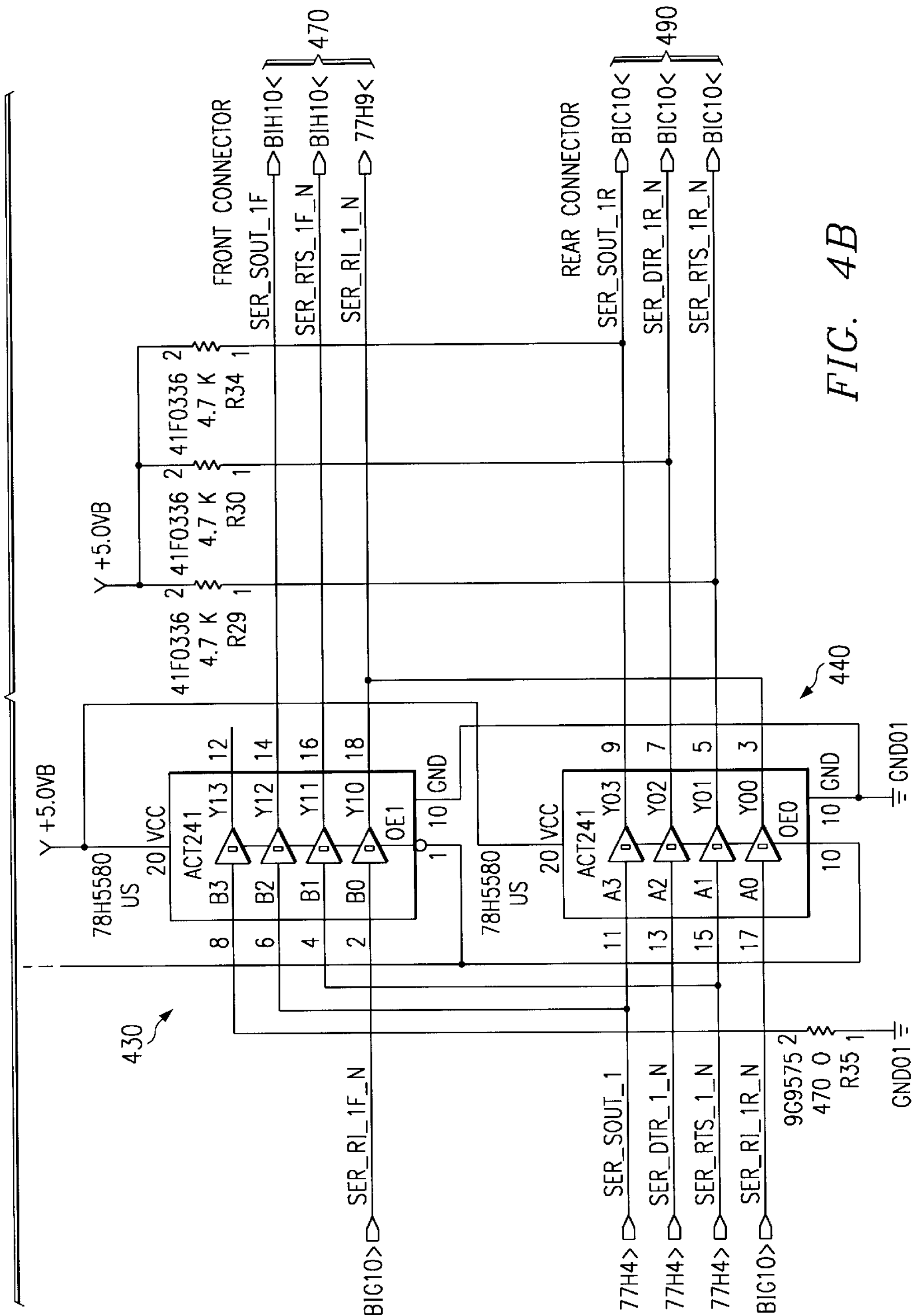

FIGS. 4A and 4B is an exemplary logic gate diagram illustrating a preferred embodiment of the present invention. As shown in FIGS. 4A and 4B, the multiplexer is comprised of four logic gates 410–440. Two of the logic gates 410 and 420 are used for receiving input from the transient connector 330 and the permanent connector 340. The other two logic, gates 430 and 440 are used for sending output to the transient connector 330 and the permanent connector 340. The logic gates 410–440 may be, for example, tristatable buffers, or the like. In the particular example shown in FIGS. 4A and 4B, the transient connector 330 is considered to be the "front connector" while the permanent connector 340 is considered to be the "rear connector."

With regard to the logic gates 410 and 420, as shown in FIGS. 4A and 4B, the logic gates 410 and 420 receive input from either the front connector or the rear connector via serial signal lines 450 and 460. The serial signal lines 450 and 460 include a signal line for a clear to send (CTS) signal, a data send ready (DSR) signal, a serial input (SIN) signal and a data carrier detect (DCD) signal. Of these signals, the DSR signal from the front connector is the selector signal used by the logic gates 410 and 420 to determine whether to switch input/output from the rear connector to the front connector.

As can be seen from FIGS. 4A and 4B, when a DSR signal is received from the front connector, the DSR signal causes the state of the line to go to a low state. When the state is low, pin 1 is active and the logic gate 410 is active. This means that the inputs from the front connector pass through the logic gate 410 to the UART device 310.

If, however, an external device is not present at the front connector, there will be no DSR signal from the serial signal lines 450. As a result, the state of the DSR signal line will be high. A high state along the DSR signal line causes pin 19 to become active and thus, logic gate 420 becomes active. In this way, input from the rear connector via the serial signal lines 460 is passed through the logic gate 420 to the UART device 310.

In a similar manner as described above, the logic gates 430 and 440 are activated by the presence of an external device at the front connector. As shown in FIGS. 4A and 4B, if a DSR signal is received along the DSR signal line, the low state of the DSR signal line causes the logic gate 430 (pin 1) to be activated and output to pass through logic gate 430 to the serial output lines 470 to the front connector. Likewise, if a DSR signal is not received along the DSR signal line, the state of the DSR signal line is high and the logic gate 440 is activated. As a result, the output from the UART device is passed through the logic gate 440 to the serial output lines 490 to the rear connector.

Thus, the present invention provides a mechanism by which an external device may be coupled to a transient connector for use with a UART device. The present invention provides a mechanism for switching input/output from a permanent connector to the transient connector when the external device is detected as being coupled to the transient connector. Once the external device is no longer coupled to the transient connector, input/output is switched back to the permanent connector.

Figure 5:
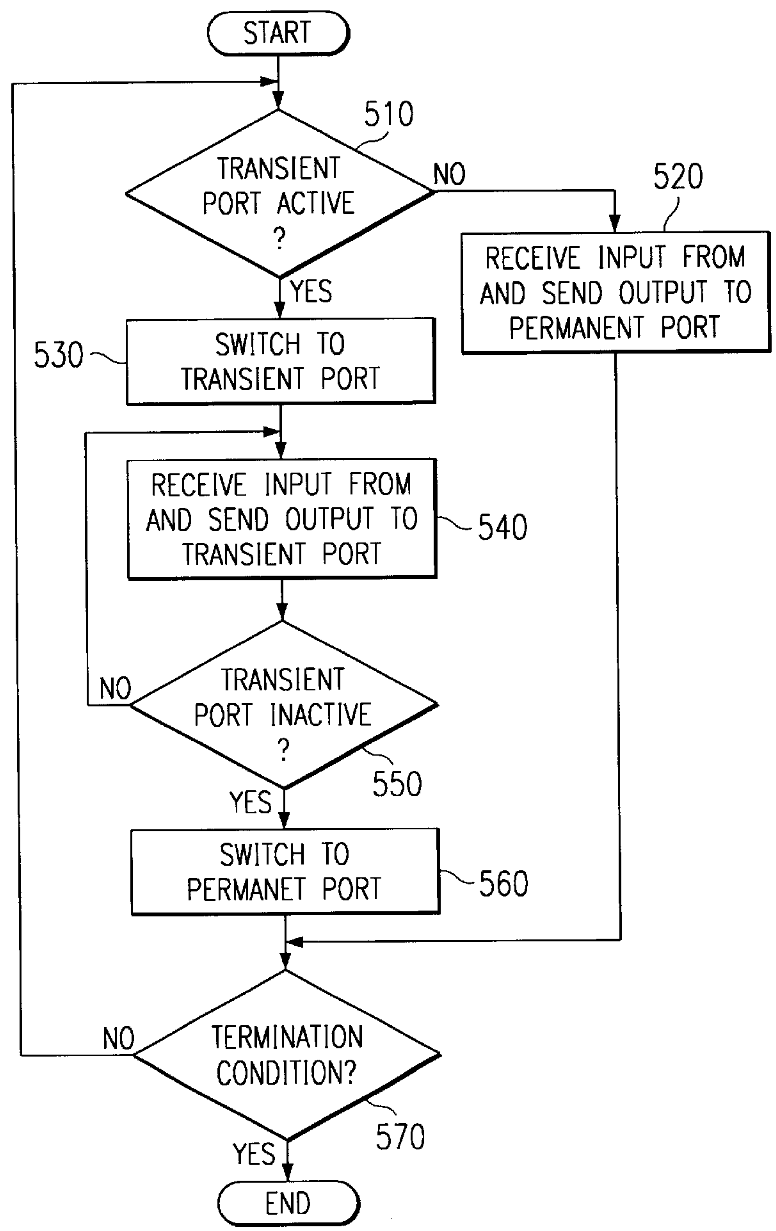
FIG. 5 is a flowchart outlining an exemplary operation of the present invention.

FIG. 5 is a flowchart outlining an exemplary operation of the present invention. As shown in FIG. 5, the operation starts with a determination as to whether or not the transient port is active (step 510). If not, input is received from and output is sent to the permanent port (step 520). If the transient port is active, input/output is switched to the transient port (step 530).

Input is received from and output is sent to the transient port (step 540). A determination is then made as to whether or not the transient port has gone inactive (step 550). If not, the operation returns to step 540 and continues to receiving input and send output via the transient port. If the transient port has gone inactive, the input/output is switched back to the permanent port (step 560).

A determination is then made as to whether or not a termination condition has occurred (step 570). This termination condition may be, for example, the device implementing the method being taken off-line, a failure condition, or the like. If a termination condition has not occurred, the operation returns to step 510 and the operation is repeated. If a termination condition has occurred, the operation ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes. of illustration and description; and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of providing, to an external device, transient access to a device having a transient connector and a permanent connector, comprising:

detecting the external device being coupled to the transient connector; and switching access from the permanent connector to the transient connector when the external device is detected as being coupled to the transient connector in order to enable transient access to the device by the external device.

2. The method of claim 1, wherein the device is a rack mounted server system.

3. The method of claim 2, wherein the permanent connector is located at a rear portion of the rack mounted server system and the transient connector is located at a front portion of the rack mounted server system.

4. The method of claim 1, wherein detecting the external device being coupled to the transient connector includes detecting a signal being sent from the transient connector.

5. The method of claim 4, wherein the signal is a data send ready signal received via a signal line from the transient connector.

6. The method of claim 1, wherein, if the external device is not detected as being coupled to the transient connector, access is provided to the permanent connector.

7. The method of claim 1, wherein when the external device is no longer detected as being coupled to the transient connector, access is switched back to the permanent connector.

8. The method of claim 1, wherein access includes receiving input from the external device and providing output to the external device.

9. The method of claim 1, wherein switching access includes deactivating a logic gate associated with the permanent connector and activating a logic gate associated with the transient connector.

10. The method of claim 9, wherein the steps of deactivating the logic gate associated with the permanent connector and activating the logic gate associated with the transient connector are performed when a state of a data send ready signal line from the transient connector is in a low state.

11. The method of claim 1, wherein the external device is an electronic device capable of providing data signaling to the device.

12. A computer program product for providing, to an external dcvice, transient access to a device having a transient connector and a permanent connector, comprising:

first instructions for detecting the external device being coupled to the transient connector; and second instructions for switching access from the permanent connector to the transient connector when the external device is detected as being coupled to the transient connector in order to enable transient access to the device by the external device.

13. The computer program product of claim 12, wherein the first instructions for detecting the external device being coupled to the transient connector include instructions for detecting a signal being sent from the transient connector.

14. The computer program product of claim 13, wherein the signal is a data send ready signal received via a signal line from the transient connector.

15. The computer program product of claim 12, further comprising third instructions for providing access to the permanent connector if the external device is not detected as being coupled to the transient connector.

16. The computer program product of claim 12, further comprising third instructions for switching access back to the permanent connector when the external device is no longer detected as being coupled to the transient connector.

17. The computer program product of claim 12, wherein access includes receiving input from the external device and providing output to the external device.

18. The computer program product of claim 12, wherein the second instructions for switching access include instructions for deactivating a logic gate associated with the permanent connector and instructions for activating a logic gate associated with the transient connector.

19. The computer program product of claim 18, wherein the instructions for deactivating the logic gate associated with the permanent connector and instructions for activating the logic gate associated with the transient connector are executed when a state of a data send ready signal line from the transient connector is in a low state.

20. The computer program product of claim 12, wherein the external device is an electronic device capable of providing data signaling to the device.

21. An apparatus for providing, to an external device, transient access to a device, comprising:

a transient connector;

a permanent connector; and a switch coupled to the transient connector and the permanent connector, wherein the switch detects the external device being coupled to the transient connector, and switches access from the permanent connector to the transient connector when the external device is detected as being coupled to the transient connector.

22. The apparatus of claim 21, wherein the device is a rack mounted server system.

23. The apparatus of claim 22, wherein the permanent connector is located at a rear portion of the rack mounted server system and the transient connector is located at a front portion of the rack mounted server system.

24. The apparatus of claim 21, wherein the switch detects the external device being coupled to the transient connector by detecting a signal being sent from the transient connector.

25. The apparatus of claim 24, wherein the signal is a data send ready signal received via a signal line from the transient connector.

26. The apparatus of claim 21, wherein, if the external device is not detected by the switch as being coupled to the transient connector, the switch provides access to the permanent connector.

27. The apparatus of claim 21, wherein when the external device is no longer detected by the switch as being coupled to the transient connector, the switch switches back access to the permanent connector.

28. The apparatus of claim 21, wherein access includes receiving input from the external device and providing output to the external device.

29. The apparatus of claim 21, wherein the switch switches access by deactivating a logic gate associated with the permanent connector and activating a logic gate associated with the transient connector.

30. The apparatus of claim 29, wherein the switch deactivates the logic gate associated with the permanent connector and activates the logic gate associated with the transient connector when a state of a data send ready signal line from the transient connector is in a low state.

31. The apparatus of claim 21, wherein the switch is a multiplexer.

32. The apparatus of claim 21, wherein the device is a universal asynchronous receive/transmit device.

33. The apparatus of claim 21, wherein at least one of the transient connector and the permanent connector are one of a serial communication port, a parallel communication port, a coaxial cable connection port, wireless communication transceiver, traditional telephone communication port, and an RS-232 connector.

34. The apparatus of claim 21, wherein the external device is an electronic device capable of providing data signaling to the device.

* * * * *